(12) United States Patent
Howard et al.

(10) Patent No.: US 7,058,930 B2
(45) Date of Patent: *Jun. 6, 2006

(54) DISTRIBUTED PROGRAM RELOCATION FOR A COMPUTER SYSTEM

(75) Inventors: Michael L. Howard, Sandy, UT (US); Stephen C. Coffin, Layton, UT (US)

(73) Assignee: Matsushita Electric Works, Ltd., Osaka (JP)

( * ) Notice: Subject to any disclaimer, the term of this patent is extended or adjusted under 35 U.S.C. 154(b) by 689 days.

This patent is subject to a terminal disclaimer.

(21) Appl. No.: 10/223,139

(22) Filed: Aug. 19, 2002

(65) Prior Publication Data

US 2003/0005158 A1   Jan. 2, 2003

Related U.S. Application Data

(63) Continuation of application No. 09/465,475, filed on Dec. 16, 1999, now Pat. No. 6,467,084.

(51) Int. Cl.
*G06F 9/45* (2006.01)

(52) U.S. Cl. .................. 717/136; 717/167; 709/223
(58) Field of Classification Search ................ 717/136, 717/162–178; 709/212, 224; 710/22, 26; 713/200; 719/331; 370/455; 380/242; 714/8
See application file for complete search history.

(56) References Cited

U.S. PATENT DOCUMENTS

| 3,483,525 A | 12/1969 | Bahrs et al. ................. 709/212 |
| 5,359,721 A | 10/1994 | Kempf et al. ................ 719/331 |
| 5,420,984 A | 5/1995 | Good et al. .................... 710/22 |
| 5,430,844 A | 7/1995 | Shitara et al. ................. 710/26 |
| 5,440,632 A | 8/1995 | Bacon et al. ................ 380/242 |
| 5,475,860 A | 12/1995 | Ellison et al. ................ 710/26 |
| 5,491,694 A | 2/1996 | Oliver et al. ................ 370/455 |
| 5,781,723 A | 7/1998 | Yee et al. .................... 713/200 |
| 5,812,774 A | 9/1998 | Kempf et al. ................ 709/212 |
| 5,890,012 A | 3/1999 | Poisner ........................ 710/22 |
| 6,108,797 A | 8/2000 | Lin et al. ........................ 714/8 |
| 6,112,240 A | 8/2000 | Pogue et al. ................ 709/224 |

*Primary Examiner*—Antony Nguyen-Ba
(74) *Attorney, Agent, or Firm*—Madson & Austin

(57) ABSTRACT

Systems and methods are disclosed for preparing program code for a first computer, wherein the systems and methods are implemented on a second computer. The systems include a relocating module that is adapted to relocate program code by modifying locations in the program code identified by location data. The modifications made by the relocating module are based on a memory address. The systems operate on program code for the first computer, where the program code is stored on the second computer. The relocating module is provided the memory address that identifies a memory location in the first computer. The memory address is suitable as a basis for modifying the program code. The relocating module is also provided with location data that identifies locations in the program code to be adjusted based on the memory address.

5 Claims, 4 Drawing Sheets

DISTRIBUTED PROGRAM RELOCATION FOR A COMPUTER SYSTEM

This application is a continuation of U.S. patent Ser. No. 09/465,475 filed Dec. 16, 1999, now U.S. Pat. No. 6,467,084.

BACKGROUND

1. The Field of the Invention

This invention relates to computer software and, more particularly, to novel systems and methods for distributing and relocating computer software and data across a computer network.

2. The Background Art

In recent years there has been a great increase in the amount of computer technology that is involved in daily life. In today's world, computer technology is involved in many aspects of a person's day. Many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM®-PC compatible, etc.

The small computers, (which can be rather large computers depending on the particular need which is being met by the computer), almost always have one or more processors at the heart of the computer. The processor(s) usually are interconnected to different external inputs and outputs and function to manage the particular device. For example, a processor in a vending machine for soda pop may be connected to the buttons used to select the pop, to the switch that allows a pop to drop down to a user, and to lights to indicate that the machine does not have any more pop of a particular variety.

Computer technology is involved in many aspects of daily life. Many appliances, devices, etc., include one or more small computers. For example, refrigerators, telephones, typewriters, automobiles, vending machines, and many different types of industrial equipment all have small computers or processors inside of them. Computer software runs the processors of these computers and tells the processors what to do to carry out certain tasks. For example, the computer software running on a processor in a vending machine may cause a soda pop to drop to a user when the correct change has been entered by a user.

These types of small computers that are a part of a device, appliance, tool, etc., are often referred to as embedded systems. The term "embedded system" usually refers to computer hardware and software that is part of a larger system. Embedded systems usually do not have typical input and output devices such as a keyboard, mouse, and/or monitor. Usually, at the heart of each embedded system is one or more processor(s).

Typically the embedded systems used today with various appliances, devices, etc., do not have a lot of storage capability. As a result, the amount of data that can be stored on the embedded systems is limited. With only limited storage, an embedded system may not have as many features and capabilities as it could have if it had more available storage. Memory is often conserved in these embedded systems that monitor, control and otherwise use electronic devices.

Almost all desktop computer systems include memory management capabilities at the processor level (hardware), firmware level (the software embedded into the hardware), and at the operating system level. However, in many embedded devices, these types of memory management capabilities are not available. For example, many of the embedded environments include an 8-bit or 16-bit microcontroller, where no substantial operating system or memory management features are present. In these types of environments, any program code is typically developed and loaded onto the embedded device by the manufacture before the device is shipped, after which software upgrades are rarely if ever even contemplated.

Because many embedded devices do not have extensive memory management capabilities, it is often difficult to easily upgrade the software, upgrade modules, upgrade components and/or to add new software, new components, new modules, new features, new extensions, etc.

BRIEF SUMMARY AND OBJECTS OF THE INVENTION

In view of the foregoing, it is an object of the present invention to provide a system and methods for preparing software for a computer.

Consistent with the foregoing object, and in accordance with the embodiments as embodied and broadly described herein, a system for preparing program code for a first computer, wherein the system is implemented on a second computer, includes a relocating module that is adapted to relocate program code by modifying locations in the program code identified by location data. The modifications made by the relocating module are based on a memory address. The system will operate on program code for the first computer, where the program code is stored on the second computer. The relocating module is provided the memory address that identifies a memory location in the first computer. The memory address is suitable as a basis for modifying the program code. The relocating module is also provided with location data that identifies locations in the program code to be adjusted based on the memory address.

A system made in accordance with the disclosed embodiments may optionally include memory usage information of the first computer from which the memory address can be derived. In addition, the system may also include a list that includes the location data. Optionally, the memory address may be obtained from the first computer.

The second computer may also include a communication module for obtaining the memory address and for communicating the modified program code to the first computer.

A method practiced in accordance with the disclosed embodiments may include the steps of obtaining the program code from a storage device in electronic communication with the second computer; obtaining a memory address identifying a memory location in the first computer, where the memory address is suitable as a basis for modifying the program code; obtaining location data that identifies locations in the program code to be adjusted based on the memory address; and modifying the locations in the program code identified by the location data, by using the memory address and by using the location data, where the modifying step is accomplished at the second computer.

One or more computer programs for implementing the described systems and/or methods may be embodied in a computer-readable medium. The computer-readable medium may be a data transmission medium.

The embodiments disclosed provide systems and methods for preparing program code for a first computer where the system and/or methods are implemented on a second computer.

The presently preferred embodiments use a minimal set of software routines for accessing storage on an embedded device (EEPROM, FLASH, battery backed-up RAM, etc.), while providing a substantial portion of the higher-level (and larger) memory-management software components on a computer connected to the embedded device(s). Thus, the preferred embodiments allow an embedded device, its capabilities and/or its features to be upgraded or enhanced.

BRIEF DESCRIPTION OF THE DRAWINGS

The foregoing and other objects and features of the present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the embodiments, as generally described and illustrated in the Figures herein, could be arranged and designed in a wide variety of different configurations. Thus, the following more detailed description of the embodiments of the systems and methods disclosed, as represented in FIGS. 1 through 5, is not intended to limit the scope of the invention, as claimed, but is merely representative of the presently preferred embodiments.

The presently preferred embodiments will be best understood by reference to the drawings, wherein like parts are designated by like numerals throughout.

A system for preparing program code for a first computer, wherein the system is implemented on a second computer, includes a relocating module that is adapted to relocate program code by modifying locations in the program code identified by location data. The modifications made by the relocating module are based on a memory address. The system will operate on program code for the first computer, where the program code is stored on the second computer. The relocating module is provided the memory address that identifies a memory location in the first computer. The memory address is suitable as a basis for modifying the program code. The relocating module is also provided with location data that identifies locations in the program code to be adjusted based on the memory address.

A system made in accordance with the disclosed embodiments may optionally include memory usage information of the first computer from which the memory address can be derived. In addition, the system may also include a list that includes the location data. Optionally, the memory address may be obtained from the first computer.

The second computer may also include a communication module for obtaining the memory address and for communicating the modified program code to the first computer.

A method practiced in accordance with the disclosed embodiments may include the steps of obtaining the program code from a storage device in electronic communication with the second computer; obtaining a memory address identifying a memory location in the first computer, where the memory address is suitable as a basis for modifying the program code; obtaining location data that identifies locations in the program code to be adjusted based on the memory address; and modifying the locations in the program code identified by the location data, by using the memory address and by using the location data, where the modifying step is accomplished at the second computer.

One or more computer programs for implementing the described systems and/or methods may be embodied in a computer-readable medium. The computer-readable medium may be a data transmission medium.

Figure 1:
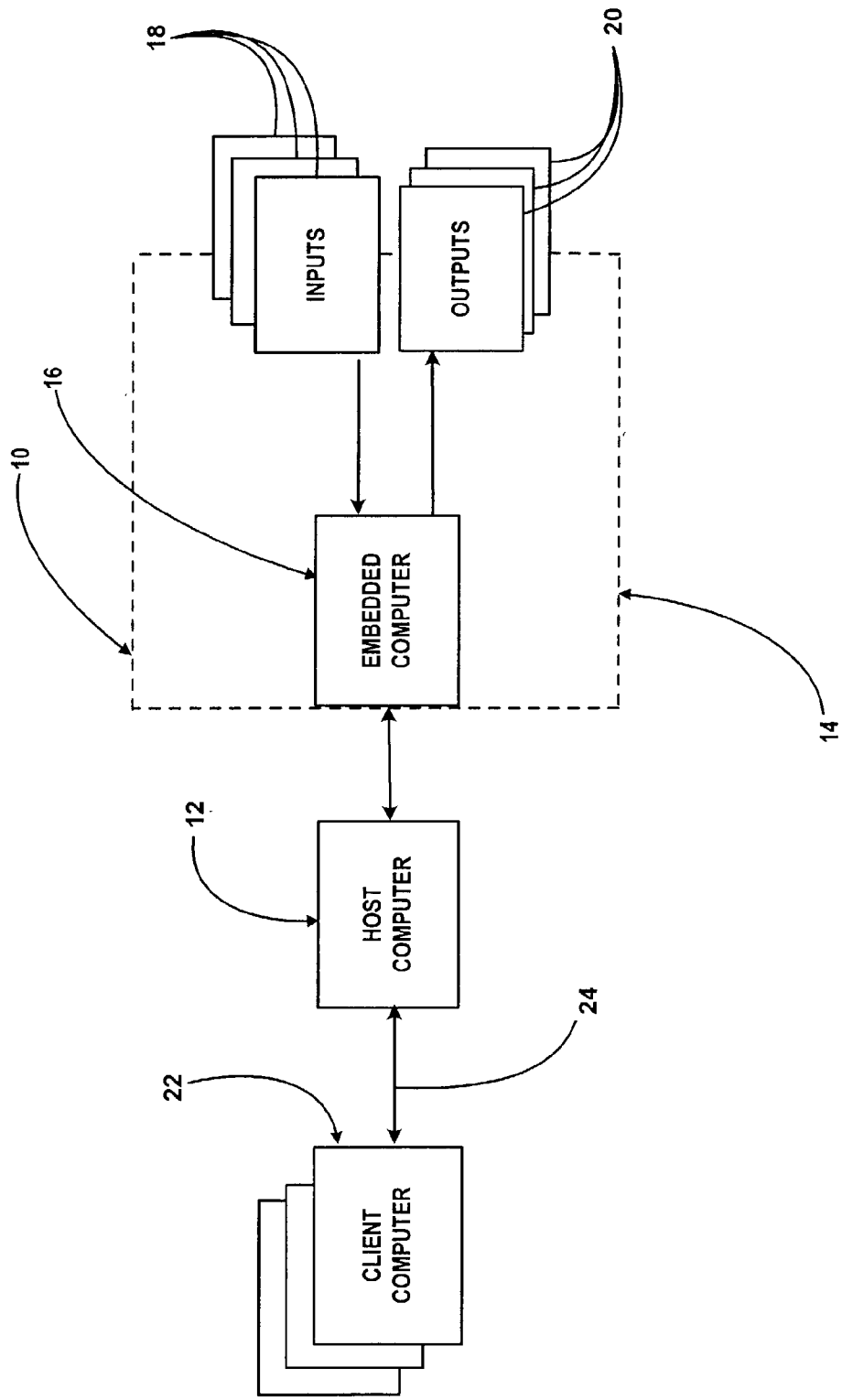
FIG. 1 is block diagram of the major hardware components included in the presently preferred embodiments.

FIG. 1 is block diagram illustrating the major hardware components typically utilized in the presently preferred embodiments. The presently preferred embodiments are used in a networked computer system 10 where a host computer 12 is connected to an embedded device 14. Typically the embedded device 14 includes a computer 16 connected to input and output devices 18, 20. The computer 16, in the presently preferred embodiments, is an embedded computer 16. Particularly, in the presently preferred embodiments, the computer 16 comprises a microcontroller (not shown). However, it will be appreciated by one skilled in the art that the functions and processing normally carried out by a microcontroller could be carried out by larger processors, whether they are part of a larger controller or part of a typical computer system.

In the presently preferred embodiments, the embedded computer 16 is remote from the host computer 12 in that the embedded computer 16 and host computer 12 are each computers capable of functioning on their own. The term remote does not necessarily mean that the embedded computer 16 is at a different location than the host computer 12, although in many embodiments the host computer 12 is at a different location than the embedded computer 16. The terms embedded computer 16 and remote computer 16 may be used interchangeably herein. Those elements discussed as being stored and/or implemented by the remote computer 16 could be stored and/or implemented at the host computer 12, in some circumstances.

The present embodiments have a broad application to many kinds of computer networks 10 and to many kinds of computers. Generally, the computer system 10 of the presently preferred embodiments also includes one or more client computers 22 for monitoring and/or controlling the embedded device 14. The remote computer 16 is operably connected to input and/or output devices 18, 20 capable of electronic communication with the remote computer 16, or, in other words, to devices 18, 20 capable of input and/or output in the form of an electrical signal. Sometimes the input and output device(s) 18, 20 and the remote computer 16 are both housed within the same physical structure.

The host computer 12 and the remote computer 16 are both broadly defined digital computers. A computer, as used herein, is any device that includes a digital processor capable of receiving and processing data. A computer includes the broad range of digital computers including microcontrollers, hand-held computers, personal computers, servers, mainframes, supercomputers, and any variation or related device thereof.

The input and output devices 18, 20 include any component, element, mechanism, appliance, or the like capable of receiving and/or generating an electronic signal. Examples of devices within the scope of the term device includes a vending machine, a telephone, a door lock, a temperature sensor, a relay, an optical sensor, a motor, a switch, a light, etc.

In current design, the host computer 12 is typically an IBM®-compatible personal computer running the Linux® operating system or the Microsoft® Windows NT® operating system. In addition, the host computer 12 may also be running the Microsoft® Windows® 95/98 operating system. The remote computer 16 typically includes an embedded processor (not shown), and, as stated, often includes a microcontroller. The devices 18, 20 can be any devices with electronic interfaces of which a processor could directly or indirectly interface and interact with.

One possible item that may be used with the present embodiments is a vending machine (not shown). Many vending machines include one or more microcontrollers for controlling different parts of the vending machines. These microcontrollers fall within the scope of remote computer 16. The input and output devices 18, 20 include the buttons for selecting items from the vending machine, switches for allowing those items to be dropped down to the user, lights for indicating which items are gone, the change release for releasing any change, etc. As known in the art, this vending machine embodiment includes the input and output devices 18, 20 and the remote computer(s) 16 integrated within the same structure. The present embodiments, therefore, may be implemented in such an environment. Those skilled in the art will also realize that the remote computer 16 may be in a separate structure from its attached input and output device(s) 18, 20. Many of the modern devices do come with embedded microcontrollers, for example, many cellular phones, pagers, copy machines, printers and the like come with embedded microcontrollers.

The host computer 12 may be connected to the remote computer 16 through a variety of connections, including RS-323, RS-485, modem, power line, wired connection, wireless connection, etc. Similarly, the remote computer 16 may be connected to various input and output devices 18, 20 through a variety of ways. As stated, typically the remote computer 16 comprises a microcontroller (not shown). Microcontrollers often have input/output ports for communicating with external devices. These specifications of the particular microcontroller often dictate how a device is connected to the microcontroller. Those skilled in the art appreciate how different devices may be connected to computers, whether they are embedded computers, standard desktop computers, mainframes, etc.

As stated, client computers 22 may also be included within the computer system 10. Such a configuration allows users to access services at the remote computer 14 through the host computer 12, even over great distances. The host computer 12 and the client computers 22 may all be connected together on a computer network 24, such as a LAN, WAN, etc. In addition, the client computer 22 may connect from a remote location to the host computer 12 via a dial up connection, via an intranet, or via the Internet.

Figure 2:
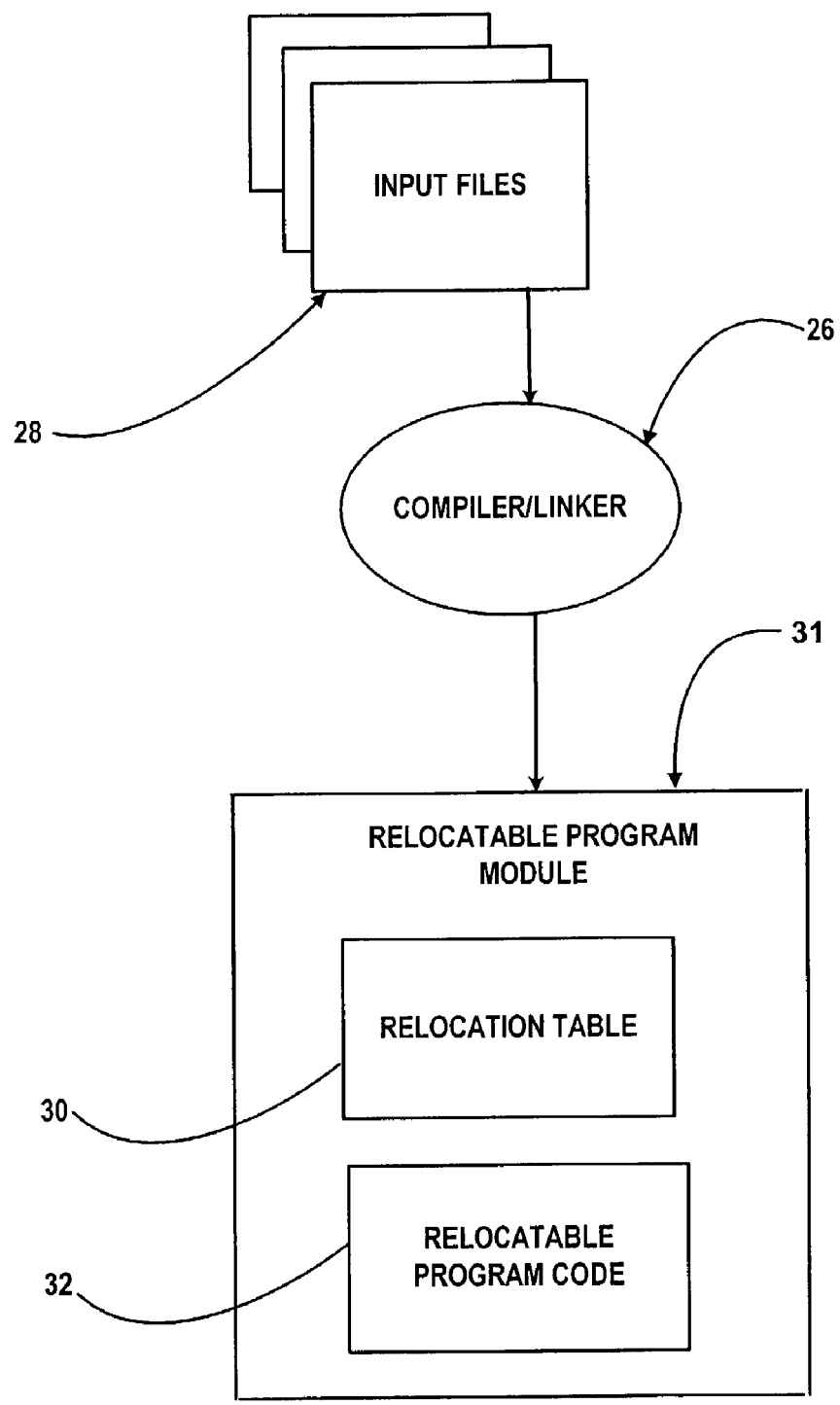
FIG. 2 is block diagram of the initial processing accomplished in the presently preferred embodiments.

FIG. 2 is an illustration depicting the initial processing that occurs in the presently preferred embodiments. As shown, a compiler 26 and/or linker 26 processes input files 28 to create a relocatable program module 31. In current design, the relocatable program module 31 includes a relocation table 30 and relocatable program code 32. The relocation table 30 is used by the presently preferred embodiment to modify the relocatable program code 32 so that it can be properly loaded onto the remote computer 16 and properly run thereon. Although in current design the relocatable program module 31 is typically one file that includes both the relocation table 30 and the relocatable program code 32, it will be appreciated by those skilled in the art that the components of the relocatable program module 31 may be stored in a variety of ways, including multiple data structures, multiple files, etc.

The input files 28 are those files that are taken as input by the compiler 26 and/or linker 26. Thus, the input files 28 of the presently preferred embodiments may be typical source files created by software engineers in developing software. Those skilled in the art will appreciate that many different kinds of source files may be used. Typically the source files used in the presently preferred embodiments are C source files (e.g., file1.c), C++ source files (e.g., file2.cpp), along with their associated header files (e.g., file1.h) and/or assembly source files (e.g., file3.asm).

The input files 28 may also be object files and/or libraries. Object files and/or libraries are typical input files 28 to a linker 26.

Those skilled in the art will appreciate what a compiler accomplishes and what a linker accomplishes. Compilers and linkers are readily available. Generally, a compiler/linker 26 is a piece of software that translates a program written in a high-level programming language (i.e., the source files and other needed files) into machine language of the target computer. In most cases, the compiler/linker 26 actually accomplishes its tasks in two stages: a compiling stage and a linking stage. The compiling stage occurs first wherein the source files are translated into machine language of the target computer. Then the linker, sometimes referred to as linkage editor, converts the output from the compiler into a form that can actually be loaded and executed by a computer. The linker's main function is to resolve or unite references between program modules and libraries of subroutines. Its output is a load module which is a program that is typically ready to run in the computer.

In the present embodiments the compiler/linker 26 is used to generate the relocatable program module 31. There are commercially available compilers/linkers 26 that can be used to generate the relocatable program module. For example, the gcc compiler from the Free Software Foundation can be used to generate a relocatable program module. In addition, the Watcom compiler from Sybase can be used.

Typical desktop computers include processors that include memory management hardware and firmware. In addition, the operating system running on the desktop also includes memory management facilities. For example, the Intel® Pentium® CPU includes memory management hardware and firmware, and the Microsoft® Windows® operating systems include memory management components as well. The combination of these memory management tools facilitates computer programs being able to run wherever the operating system properly places it in memory. Because of these memory management tools, computer programs for desktop computers can be compiled and linked with little or no knowledge of the specific location in memory it will be placed when it is executed.

Many of the embedded devices being used today use 8-bit and 16-bit microcontrollers that either do not have memory management hardware and firmware, or only have very limited memory management capabilities. In addition, typically where these types of microcontrollers are used, the embedded system has very little memory. In many cases in such resource constrained environments, and because there is limited memory resources, there is no operating system provided. Accordingly, there is no operating system to provide memory management functionality in these types of systems.

For these resource constrained embedded environments, as just described, in order for program code to be linked together so that it can be loaded and executed by the embedded environment, the compiler/linker 26 would need to know the addresses in the memory of the remote computer where the program code was going to be placed. The present embodiments overcome this requirement by allowing the program code for the remote computer to be compiled and linked first into a relocatable program format. Then, at a later time and when the particular addresses of where the program code is to be placed on the remote computer are known, the program code can be relocated and loaded onto the remote computer. An initial step in practicing the presently preferred embodiments is to compile and/or link the program code into relocatable code.

The compiler/linker 26 is used to translate the input files 28 into relocatable program code 32. The compiler/linker 26 also generates a relocation table 30. In the presently preferred embodiment, the relocatable program code 32 is machine language for the remote computer 16 that would be ready to load and run on the remote computer 16 if any existing unresolved address references were resolved. The relocation table 30 of the preferred embodiment contains a list of references in the relocatable program code 32 that need to be resolved once it is known where in the remote computer 16 memory the program code 32 is to be loaded. In current design, the relocation table 30 identifies the location of the reference and the size of the reference that needs to be adjusted.

Those skilled in the art have authored computer programs including writing the source code, compiling and linking it, and then executing the program on the target computer. Thus, those skilled in the art understand the contents and significance of input files 28, compiled code and linked code. Accordingly, the following examples included in Tables 1–6 are meant to illustrate the principles of the presently preferred embodiments and are not meant to show actual program code source files, compiled code or the like.

Table 1 illustrates in skeletal form and in pseudocode form a source file.

TABLE 1

| | |
|---|---|
| 1A | main program |
| 1B | <program instructions> |
| 1C | call to functionA |
| 1D | <program instructions> |
| 1E | call to functionB |
| 1F | <program instructions> |
| 1G | jump to placeC |
| 1H | <program instructions> |

As illustrated in Table 1, a source file may include a function or procedure entitled main 1A. The main function 1A may include various program instructions, illustrated at 1B, 1D, 1F and 1H. Included in the instructions of the function may be calls to other functions or procedures, illustrated by a call to functionA 1C and a call to functionB 1E. The instructions may also include a jump to placeC 1G. After compiling the source file there may be various addresses needed in order to completely link the code together. For example, various function calls and jumps may need to have addresses in order to be resolved. In the presently preferred embodiment, a list, table, file or other data structure is used to track what references in the compiled program code need to be resolved before it can be loaded and executed on the remote computer 16.

Table 2 contains pseudocode illustrating what types of information may be stored in the relocation table 30. Following the example of Table 1, a relocation table 30 may contain the information necessary to identify the addresses that need to be resolved or updated when the specific memory location is known, and also the information necessary to know what size the address is that needs to be updated. Table 2 includes the offset address for the call to functionA 2A. In addition, Table 2 illustrates the storage of the size of the address 2A that needs to be resolved or updated. Thus, the program code 32 can be linked and be made ready for the remote computer, once the memory addresses are known, by cycling through the relocation table 30, going to each indicated offset address and adjusting the address according to the newly found memory information of exactly where in memory the functionA code will be found. The information 2B for functionB is also stored in the relocation table. Similarly, the reference to the jump is also stored in the relocation table so that it can be updated according to the memory information to be obtained.

TABLE 2

| | |
|---|---|
| 2A | functionA call offset address, size of address |
| 2B | functionB call offset address, size of address |
| 2C | jump to placeC offset, size of address |

In the preferred embodiment, the information contained in the relocation table 30 is used to update the relocatable program code 32 so that it can be loaded and executed on the remote computer. Table 3 illustrates what the relocatable program code may contain, following the example illustrated in Tables 1 and 2. The relocatable program code 32 contains machine language 3A–3H for the remote computer. Included in these machine language instructions 3A–3H are instructions that include addresses that are not yet resolved or finalized.

TABLE 3

| | |
|---|---|
| 3A | <machine language> |
| 3B | <machine language> |
| 3C | <machine language-call to functionA at XXXX> |
| 3D | <machine language> |
| 3E | <machine language-call to functionB at YYYY> |
| 3F | <machine language> |
| 3G | <machine language-jump to placeC at ZZZZ> |
| 3H | <machine language> |

The example of the call fo functionA is illustrated in machine language 3C. Because this call is in relocatable format, the address to go to, indicated at XXXX, is not yet finalized. Once the memory addresses for the program code are known from the remote computer, the address XXXX may be updated to reflect the location where the code is to be loaded into the remote computer's memory. Similar to the machine language call to functionA 3C, the machine language call to functionB 3E can be resolved by updating the address of YYYY. The address ZZZZ included in the machine language jump to placeC 3G can also be updated.

Once the various unresolved addresses have been updated or resolved, the modified program code is ready to be loaded onto the remote computer.

The following examples included in Tables 4–6 are also meant to illustrate the principles of the presently preferred embodiments and are not meant to show actual program code source files, compiled code or the like. In the examples of Tables 4–6, references to both program memory and data memory will be illustrated. It will be appreciated by those skilled in the art that in certain systems program memory and data memory will be in separate spaces. If they are in separate spaces, references to program memory may be updated based on a program memory address, and references to data program memory may be updated based on a data memory address.

Table 4 illustrates in skeletal form and in pseudocode form a source file.

TABLE 4

| | |
|---|---|
| 4A | main program |
| 4B | <program instructions> |
| 4C | call to functionA |
| 4D | <program instructions> |
| 4E | <instruction> reference to dataA in data memory |
| 4F | <instruction> reference to dataB in data memory |

As illustrated in Table 4, a source file may include a function or procedure entitled main 4A. The main function 4A may include various program instructions, illustrated at 4B and 4D. Included in the instructions of the function may be calls to other functions or procedures, and instructions with data references, illustrated by a call to functionA 4C and instructions with data references 4E, 4F. After compiling the source file there may be various addresses needed in order to completely link the code together. For example, various function calls, jumps and/or data references may need to have addresses in order to be resolved. In the presently preferred embodiments, a list, table, file or other data structure is used to track what references in the compiled/linked program code need to be resolved before it can be loaded and executed on the remote computer 16.

Table 5 contains pseudocode illustrating what types of information may be stored in the relocation table 30. Following the example of Table 4, a relocation table 30 may contain the information necessary to identify the addresses that need to be resolved or updated when the specific memory locations are known, and also the information necessary to know what size the address is that needs to be updated. Table 5 includes the offset address for the call to functionA 5A. In addition, Table 5 illustrates the storage of the size of the address 5A that needs to be resolved or updated. Thus, the program code 32 can be relocated and be made ready for the remote computer, once the memory addresses are known, by cycling through the relocation table 30, going to each indicated offset address and adjusting the address according to the newly found memory information of exactly where in memory the functionA code will be found.

Table 5 also includes the address for the reference to dataA 5B in data memory. It also includes the size 5B of the address that needs to be resolved or updated. Similarly, the address for the reference to dataB 5C in data memory is also included, with the size of its address 5C.

TABLE 5

| | |
|---|---|
| 5A | functionA call offset address, size of address |
| 5B | reference to dataA address, size of address |
| 5C | reference to dataB address, size of address |

In the preferred embodiments, the information contained in the relocation table 30 is used to update and relocate the relocatable program code 32 so that it can be loaded and executed on the remote computer. Table 6 illustrates what the relocatable program code may contain, following the example illustrated in Tables 4 and 5. The relocatable program code 32 contains machine language 6A–6F for the remote computer. Included in these machine language instructions 6A–6F are instructions that include addresses that are not yet resolved or finalized.

TABLE 6

| | |
|---|---|
| 6A | <machine language> |
| 6B | <machine language> |
| 6C | <machine language-call to functionA at PXXXX> |
| 6D | <machine language> |
| 6E | <machine language-reference to dataA at DYYYY> |
| 6F | <machine language-reference to dataB at DZZZZ> |

The example of the call fo functionA is illustrated in machine language 6C. Because this call is in relocatable format, the address to go to, indicated at PXXXX, is not yet finalized. Once the memory addresses for the program area are known from the remote computer, the address PXXXX may be updated to reflect the location where the code is to be loaded into the remote computer's memory. Thus, the program code can be relocated.

The machine language that includes a reference to dataA 6E also needs to be resolved. Once the memory addresses for the data areas are known from the remote computer, the address at DYYYY may be updated. Similarly, when the data areas are known, the reference to dataB at DZZZZ 6F may be updated. Thus, the data references to data memory can be relocated. Once the various unresolved addresses have been updated or resolved, the program code, including items to be placed in data memory as well as items to be placed in program memory, is ready to be loaded onto the remote computer.

Although the foregoing example illustrates when the program memory may be separate from the data memory, generally as used herein, the term program code refers to all data that makes up the code to be loaded onto the remote computer, including both items to be placed in program memory and items to be placed in data memory. The foregoing example was only meant to illustrate an embodiment where there are separate program and data areas on the remote computer, and it was not meant to limit the broad application of the present embodiments.

Figure 3:
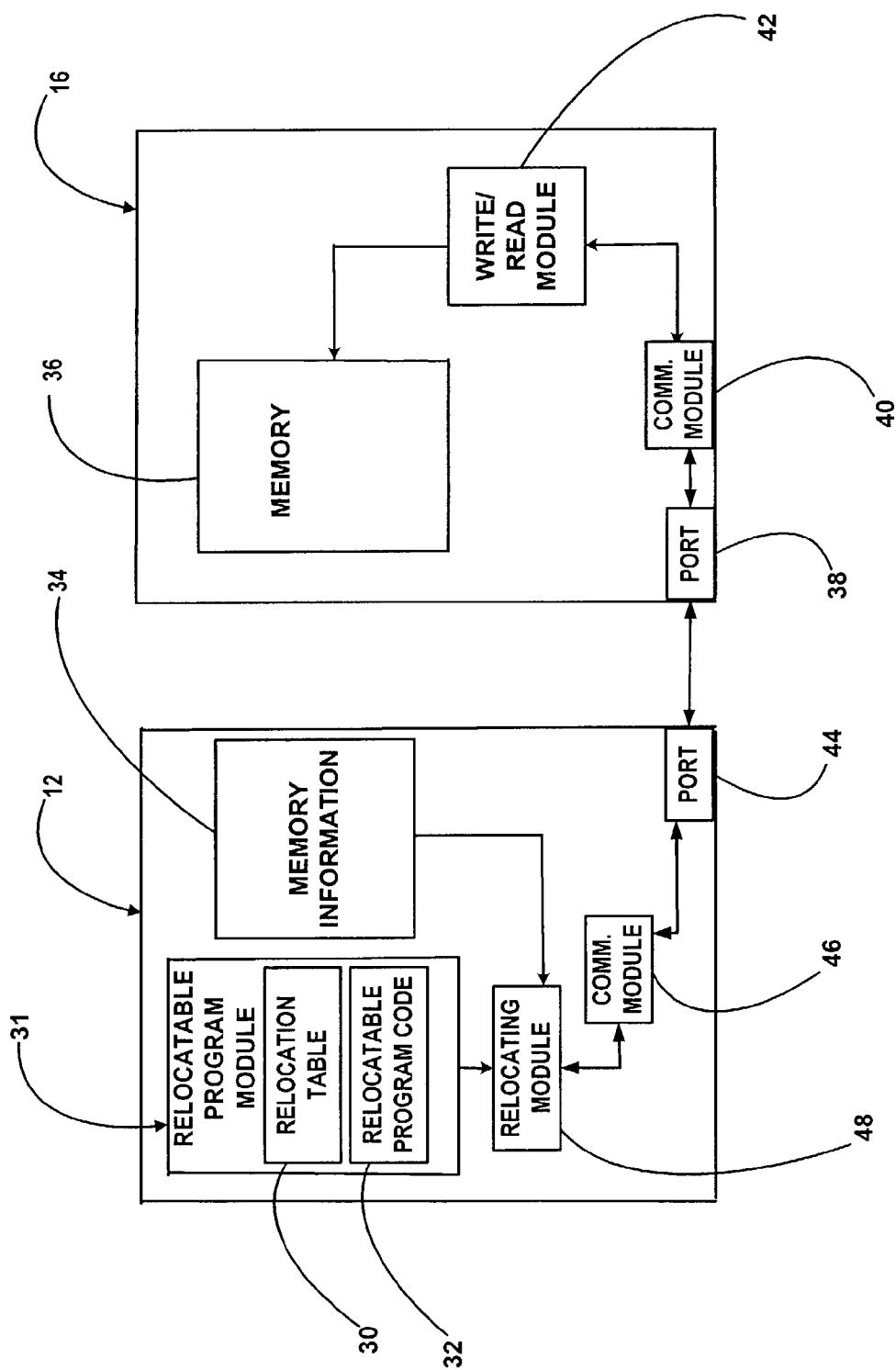
FIG. 3 is a block diagram of the major computer program and data components of the presently preferred embodiments.

FIG. 3 illustrates the major computer program and data components of the presently preferred embodiments. In current design, the relocatable program module 31, comprising the relocation table 30 and the relocatable program code 32, are stored on the host computer 12. In addition, information 34 about the memory of the remote computer 16 is stored on the host computer 12. The memory information 34 may be simply an address, it may include multiple starting addresses and sizes available, it may be a memory map 34 of the remote computer 16, or it may include other information that somehow describes the memory layout of the remote computer 16. In the preferred embodiments, the memory information 34 indicates what memory is being used and what memory is available for use at the remote computer 16. In addition, in current design the memory information 34 indicates what specifically is being stored at each memory location in the remote computer 16. This enables software developers to more precisely target particular memory locations to be updated or changed without necessary rewriting all the data to the entire memory 36 of the remote computer 16.

The remote computer 16 communicates with the host computer 12 through an embedded communications port 36. In current design, a communications module 40 provides communication using the communications port 38. The communications module 40 relays data to and from a write module 42. The write module 42 may also include additional functionality. For example, the write module 42 may also be able to read data. The write module 42 may read data from and may write data to the memory 36 of the remote computer 16. One skilled in the art will appreciate that the write module 42 may include the code necessary to directly interface with the communications port 38 at the remote computer 16. Thus, the write module 42 may receive data directly from the communications port 38.

The optional communications module 40 or code 40 provides access to the communications port 38, and ensures that data relayed to and from the communications port 38 is in appropriately sized and formatted pieces, and that data received from the communications port 38 is correctly read from the port 38.

The host computer 12 includes a communication port 44 in electronic communication with the communications port 38 of the remote computer 16. As discussed earlier, there are a variety of such ports available with computers that are capable of interfacing with a remote and/or embedded computer port 38. An optional communication module 46 provides features similar to those provided by the communications module 40 of the remote computer 16. The communications module 46 correctly formats data that is written to and read from the communications port 44.

In the presently preferred embodiments, a relocating module 48 that manages the relocating of the program code and the loading of program code onto the remote computer 16 links and resolves any unresolved addresses in the relocatable program code 32 and loads it onto the remote computer 16. Before the relocating module 48 accomplishes this task, the relocating module 48 obtains the needed memory insertion address(es). The relocating module 48 may obtain the necessary memory insertion address(es) from either examining the memory information 34 or from querying the remote computer 16. Of course, if the relocating module 48 is to obtain the necessary address(es) from the remote computer 16, the remote computer 16 would need to have the capability to respond to such a query.

If the relocating module 48 is to obtain the necessary address(es) from the remote computer 16, the remote computer 16 would need to have the necessary software module to enable it to respond to such a query. A memory usage data structure (not shown) could be placed on the remote computer 16 to track where in memory 36 new program code can be placed. It will be appreciated by those skilled in the art that the more program code that is placed on the remoter computer 16, the less space is left for revisions, updates and extensions. Thus, for resource constrained systems, any memory usage data structure (not shown) at the remote computer 16 should be kept as small as possible. Of course, to the extent memory is not as critical an issue in the system, the memory usage data structure size may vary accordingly.

Once the relocating module 48 obtains the needed memory address(es), it examines the relocation table 30 to find the instructions in the relocatable program code 32 that need to be updated. Then, by using the information in the relocation table 30, the relocating module 48 resolves the unresolved addresses in the relocatable program code 32 and then loads the updated program code 32 onto the remote computer 16. The relocating module 48 may load the updated code onto the remote computer 16 via the communication modules 40, 46 and the interfacing ports 38, 44. In current design, through the aforementioned communication pathway the relocating module 48 directs the write module 42 to write the updated program code to the memory 36 of the remote computer 16.

Figure 4:
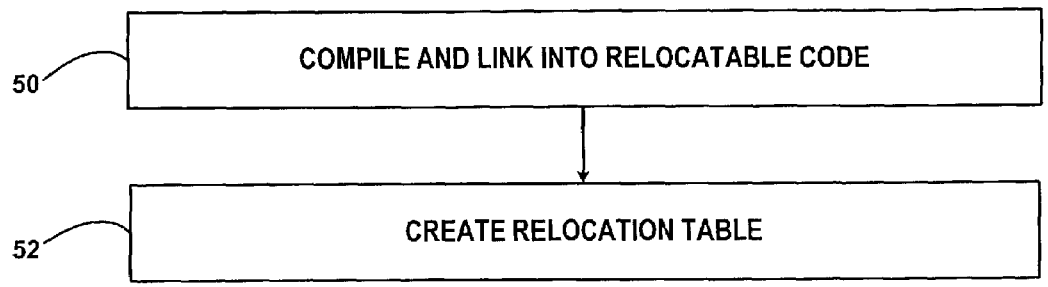
FIG. 4 is a flow diagram of the initial processing accomplished in the presently preferred embodiments.

FIG. 4 is a flow diagram illustrating the initial steps that take place in the presently preferred embodiments before the updated program code is loaded onto the remote computer 16. First, a user of the presently preferred embodiment compiles and links 50 the program into the relocatable program code 32. The user also creates 52 a relocation table 30 identifying the locations in the relocatable program code 32 that need to be adjusted. These steps can be accomplished through commercially available compilers, linkers and/or tools, as mentioned above.

Figure 5:
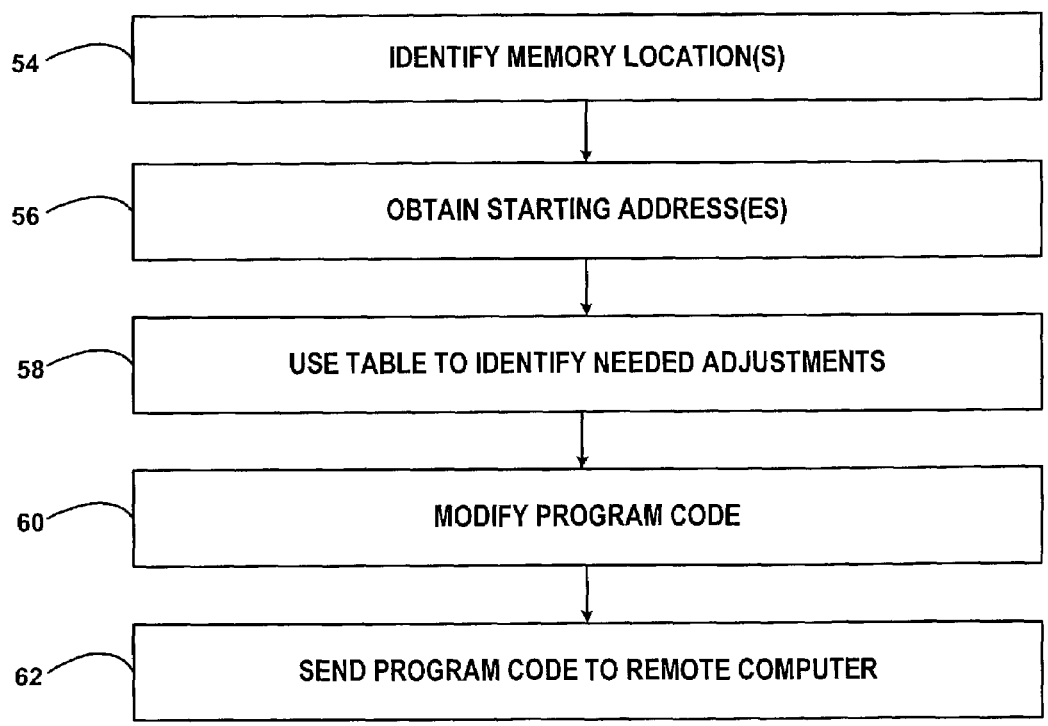
FIG. 5 is a flow diagram illustrating steps that are followed in the presently preferred embodiments.

FIG. 5 is a flow diagram illustrating the steps that take place in the presently preferred embodiment to load the updated program code onto the remote computer 16. Once the relocatable program code 32 and relocatable table 30 have been created, in current design the steps of FIG. 5 are performed. The preferred embodiments identify 54 the one or more memory locations or areas of the remote computer 16 where the updated program code may be placed. From these memory locations, the preferred embodiments obtain 56 the starting address(es), which is/are the memory address (es) of the remote computer 16 where the program code will begin. The relocating module 48 then, with this known information, uses 58 the relocation table 30 to identify the instructions and/or memory references of the relocatable program code 32 that need to be adjusted. Then the relocating module 48 modifies 60 the program code 32 for placement in the remote computer 16. After the code has been modified 60 for placement, the modified program code is sent 62 to the remote computer 16 via the communication pathway as previously described. It will be appreciated by those skilled in the art that the relocating module 48 may store the modified program code to a storage device before the modified program code is sent 62 to the remote computer.

In the presently preferred embodiments commercially available software from emWare, Inc. is used in implementing the embodiments. emWare, Inc. may be contacted through its web site at http://www.emware.com. One skilled in the art will appreciate how the commercially availably software items from emWare can be used with the present embodiments. The following is a general and basic description of technology of emWare that is used in the presently preferred embodiments.

emWare's business centers around microcontrollers that manage many electronic devices used in today's world, including telephones, home appliances, office equipment. ATMs, security systems, VCRs, automobiles, etc. These microcontrollers are embedded into millions of intelligent electronic devices.

emWare has developed technology and software which provide distributed network-based device control. emWare's Embedded Micro Internetworking Technology (EMIT®) software is designed to move the majority of software off of the embedded microcontroller and distribute it to more capable computers over a network. EMIT® software has also been developed to leverage existing Internet technologies.

Use of EMIT® software involves various components including the following: a customer's embedded application (which is the program already on the remote computer 16 or the program to be placed on the remote computer 16), emMicro software (which correlates to the communication module 40 and read/write module 42), emGateway software, emNet software (which correlates to the communication modules 40 and 46), and the customer's monitoring/controlling application (which is loaded onto the client computers 22 for monitoring and controlling the embedded device 14). Typically, potential customers of emWare already have embedded environments in which they plan to deploy emWare's EMIT® software to enhance their monitoring and controlling capabilities. These embedded environments typically include the embedded system 14, the host computer 12, and client computers 22.

emMicro is used in the presently preferred embodiments on the remote computer 16 for relaying information from the remote computer 16 to the host computer 12. Service information is information about the functions, variables, events and files of the embedded application running on the remote computer 16.

The communications between the host computer 12 and the remote computer 16 running emMicro are usually accomplished via a lightweight network such as RS-232, RS-485, RF, or IR. The emNet component is responsible for handling communications between emMicro and the software on the host computer 12.

From the above discussion, it will be appreciated that the present embodiments disclosed provide systems and methods for preparing program code for a first computer where the system and/or methods are implemented on a second computer.

The present embodiments may be embodied in other specific forms without departing from their spirit or essential characteristics. The described embodiments are to be considered in all respects only as illustrative, and not restrictive.

The scope of the invention is, therefore, indicated by the appended claims, rather than by the foregoing description. All changes which come within the meaning and range of equivalency of the claims are to be embraced within their scope.

The invention claimed is:

1. A system embodied in a computer-readable storage medium for preparing program code for an embedded microcontroller wherein the system is executable by a host computer and not executable by the embedded microcontroller, the system comprising:
   relocatable microcontroller program code executable by the embedded microcontroller;
   a memory address identifying a memory location in the embedded microcontroller with an area sufficient to store the relocatable microcontroller program code;
   a relocation table identifying addresses in the relocatable microcontroller program code to be adjusted based on the memory address; and
   a relocating module executable by the host computer and not executable by the embedded microcontroller, the relocating module adapted to relocate the relocatable microcontroller program code to the area by modifying the addresses in the relocatable microcontroller program code identified by the relocation table, the modifications being based on the memory address.

2. The system of claim 1 further comprising information regarding memory usage of the embedded microcontroller from which the memory address is derived.

3. The system of claim 1, wherein the relocation table further comprises a plurality of offset addresses.

4. The system of claim 1, wherein the memory address is obtained from the embedded microcontroller.

5. The system of claim 1 further comprising a communication module at the host computer for obtaining the memory address and for communicating the relocatable microcontroller program code to the embedded microcontroller.

* * * * *

UNITED STATES PATENT AND TRADEMARK OFFICE
CERTIFICATE OF CORRECTION

PATENT NO. : 7,058,930 B2 Page 1 of 1
APPLICATION NO. : 10/223139
DATED : June 6, 2006
INVENTOR(S) : Michael Howard et al.

It is certified that error appears in the above-identified patent and that said Letters Patent is hereby corrected as shown below:

Column 5, line 43, please replace "RS-323" with --RS-232--.
Column 12, line 60, please replace "office equipment." with --office equipment,--.

Signed and Sealed this

Twelfth Day of December, 2006

JON W. DUDAS
*Director of the United States Patent and Trademark Office*